United States Patent [19]

Stephan

[11] Patent Number: 5,472,220
[45] Date of Patent: Dec. 5, 1995

[54] BUCKET DOLLY

[76] Inventor: Gerard A. Stephan, 11 Oak Pl., Selden, N.Y. 11784

[21] Appl. No.: 315,771

[22] Filed: Sep. 30, 1994

[51] Int. Cl.⁶ .................................................. B62B 3/04
[52] U.S. Cl. ................................. 280/79.5; 280/79.11
[58] Field of Search ........................ 280/79.5, 35, 47.34, 280/79.11, 87.01; 16/47; 248/346.1; 220/DIG. 1; 24/486

[56] References Cited

U.S. PATENT DOCUMENTS

| | | | |
|---|---|---|---|
| 422,729 | 3/1890 | Clark | 280/79.5 |
| 1,013,605 | 1/1912 | Lyon | 280/79.5 |
| 2,531,131 | 11/1950 | Johnson | 280/79.5 |
| 2,573,085 | 10/1951 | Yonkers | 280/79.5 |
| 2,772,889 | 12/1956 | Reynolds | 280/35 |
| 2,917,769 | 12/1959 | Kasper | 280/79.5 |
| 3,554,573 | 1/1971 | Miller | 280/79.5 |
| 3,734,527 | 5/1973 | Bard | 280/79.5 |
| 5,123,667 | 6/1992 | Stolzman | 280/79.5 |

*Primary Examiner*—Margaret A. Focarino
*Assistant Examiner*—Carla Mattix
*Attorney, Agent, or Firm*—Alfred M. Walker

[57] ABSTRACT

The present invention includes a dolly with an upwardly extending edge about 3 to 5 inches high, that generally conforms to the size of a standard five gallon bucket. The purpose of the invention is to be able to push around whatever materials one is working with, without having to pick the bucket up to move it. The upwardly extending edge on the dolly prevents the bucket from tipping as it is being pushed or pulled. Also, additional wheels can be added to distribute the weight load more evenly, and the wheels can be raised or lowered to lower the center of gravity, to help avoid tipping of the bucket within the dolly. The dolly can be used by a person sealing a driveway with a five gallon pail bucket. Painters or spacklers can also benefit from the bucket dolly. Spacklers can stack pails on top of each other as they normally do so that they can reach into the uppermost pail and move their materials around without reaching down and getting down out of their elevated stilts or scaffolds.

1 Claim, 2 Drawing Sheets

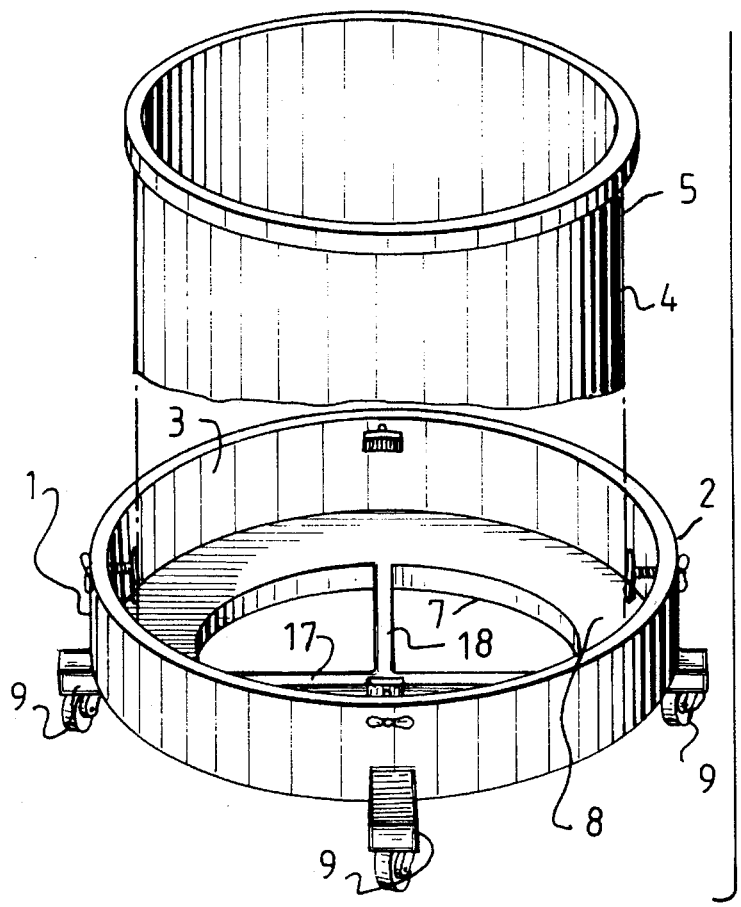
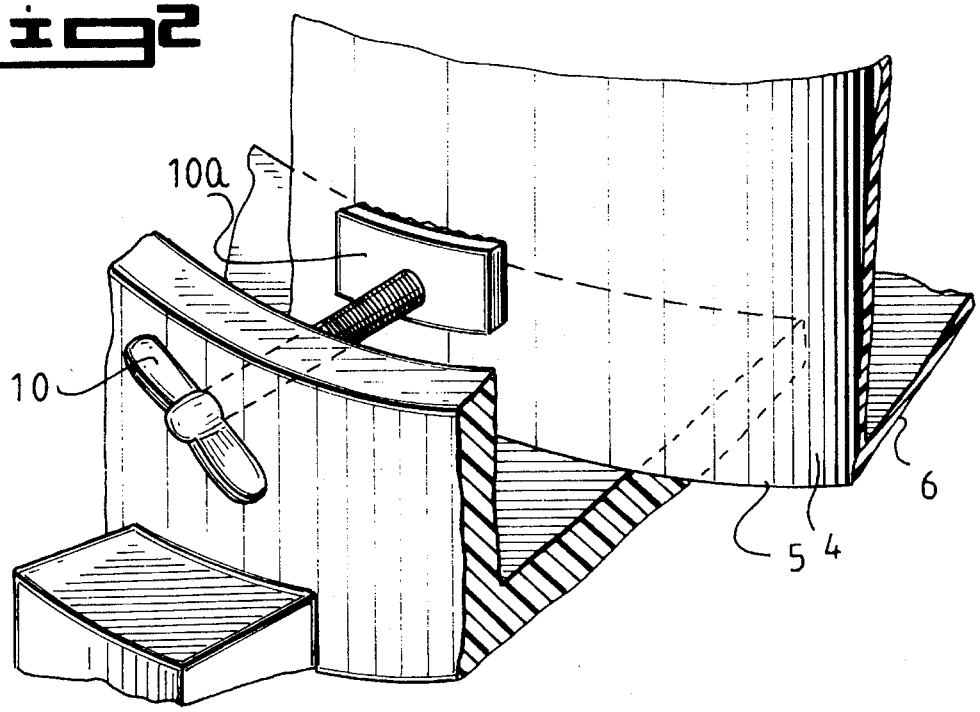

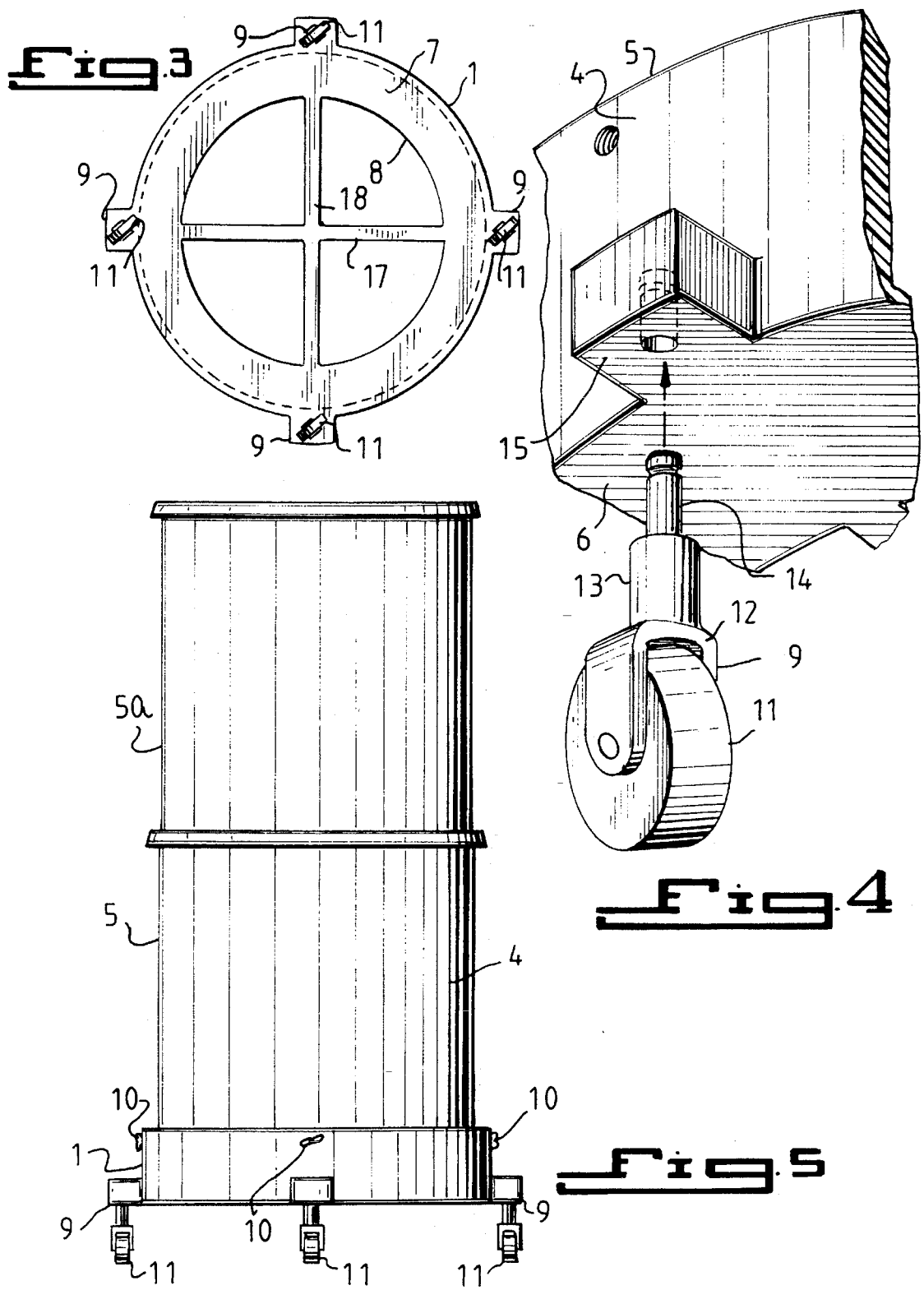

BUCKET DOLLY

This application includes the subject matter of Applicant's Disclosure Document No. 349261, filed Mar. 1, 1994, entitled "Bucket Dolly".

FIELD OF THE INVENTION

The present invention includes a wheeled dolly with an upwardly extending edge that conforms to the size of a standard five gallon bucket.

BACKGROUND OF THE INVENTION

When working with construction materials in a five gallon pail bucket, such as spackle or paint, it is necessary to move around whatever materials one is working with by picking up the pail up to move it. Placing the bucket upon a standard flat dolly undesirably enhances the possibility of tipping the pail and its contents as it is being pushed or pulled.

It is known to provide janitorial wash buckets with built in castors to move the buckets around a floor. However, it is not known to provide a dolly for insertion of buckets therein to move the buckets without having to actually pick up the buckets.

Moreover, while it is known to insert small bucket stacker shelved portions within a non-movable bucket, such as the "Stacker Packer" of Duluth Trading Co., St. Paul, Minn. 55107, the "Bucket Stackers" also of Duluth Trading Co. and the custom tray sets of Journeyman Products, Ltd. of Millersville, Md. 21108, it is not known to provide a movable dolly within which an entire bucket can be inserted for moving the bucket without having to pick up the bucket.

OBJECTS OF THE INVENTION

It is an object of the present invention to move a bucket with construction materials without having to pick the bucket up.

It is yet another object to provide a dolly with an upwardly extending edge that conforms to the size of a standard five gallon bucket.

It is yet another object to provide a bucket dolly to push around construction materials upon a work surface, such as a floor or a driveway, without having to pick the bucket up to move it.

It is yet another object to provide a dolly which prevents the bucket from tipping as it was being pushed or pulled.

It is yet another object to provide a movable bucket dolly with wheels to distribute the weight load more evenly.

It is a further object to provide a bucket dolly with wheels which can be raised or lowered to lower the center of gravity, to help avoid tipping.

It is yet another object to provide a cleaner work environment in construction to avoid messy jobs.

It is yet another object to provide a bucket dolly to enable painters or spacklers to move spackle or paint buckets without picking up the buckets.

It is a further object to provide a bucket dolly which enables a worker to provide a movable stack of pails on top of each other to move construction materials around without the workers having to get out of their stilts.

It is yet another object to improve over the disadvantages of the prior art.

SUMMARY OF THE INVENTION

In keeping with these objects and others which will become apparent, the present invention consists of a dolly with an upwardly extending edge, about 3 to 5 inches high, that conforms to the size of a standard five gallon bucket and enables the bucket to be inserted therein.

The bucket dolly includes a base portion with equidistantly spaced rollers, such as wheels or castors, to be able to push around a bucket with whatever materials a worker is working with, without having to pick the bucket up to move it. The upwardly extending edge on the dolly prevents the bucket from tipping as it is being pushed or pulled. Additional wheels or castors can be added to distribute the weight load more evenly. The wheels or castors can be raised or lowered to lower the center of gravity, to help avoid tipping of the bucket within the dolly.

The bucket dolly can be used by a person sealing a driveway with a five gallon bucket and a roller. The dolly enables the bucket to be moved without having to pick the bucket up. As a result, the worker can work cleaner, because driveway sealing is a messy job.

Painters or spacklers can also benefit from being able to move the spackle or paint buckets around the floor. Spacklers can also stack buckets on top of each other as they normally do so that they can reach into the uppermost bucket and move their stack of buckets around without having to get down out of their stilts or scaffold.

DESCRIPTION OF THE DRAWINGS

The present invention can best be understood in conjunction with the accompanying drawings, in which:

FIG. 1 is a perspective view of the bucket dolly of the present invention, showing in an exploded view a portion of a bucket for insertion therein.

FIG. 2 is a close up perspective view of a fastening means of the bucket dolly as in FIG. 1.

FIG. 3 is a bottom view of the bucket dolly as in FIG. 1.

FIG. 4 is a close up exploded perspective view of the wheeled portion of the bucket dolly as in FIG. 1.

FIG. 5 is a side elevation view of the bucket dolly as in FIG. 1, showing a plurality of buckets stacked therein.

DETAILED DESCRIPTION OF THE PREFERRED EMBODIMENT

As shown in FIGS. 1–5, the present invention includes a movable bucket dolly 1 with an upwardly extending side edge 2, about 3 to 5 inches high, with an inner surface 3 which conforms to the size of the outer diameter edge 4 of a standard five gallon bucket 5 having a bottom edge 6.

Bucket dolly 1 further includes base 7 with platform portion 8 to hold bottom edge 6 of bucket 5, and a plurality of wheeled portions 9, to enable a worker to move around whatever materials the worker is working with, without having to manually pick up bucket 5 in order to move bucket 5.

Tightening means 10, which are provided through upwardly extending side edge 2 of bucket dolly 1, prevent bucket 5 from tipping as bucket dolly 1 is being pushed or pulled.

Optional additional wheeled portion 9 can be added to distribute the weight load of the contents of the material of bucket 5 more evenly. Wheels or castors 11 of wheeled portion 9 can be raised or lowered to lower the center of gravity, to help avoid tipping of a top heavy, or full, bucket 5.

Moreover, while three or more castors on wheeled portion 9 may be used to stabilize bucket dolly 1, it is understood that optionally roller bearings may also be used to move bucket dolly 1 around.

Optionally as shown in FIG. 5, a spackler can stack one or more additional upper buckets 5a on top of lower bucket 5 so that a spackler can reach into the upper most bucket 5a and move the materials around without having to get out of elevated stilts or down from a scaffold.

While tightening means 10, such as wing nuts, may be applied against auxiliary padded portions 10a of outer surface 4 of bucket 5, it is also understood that inner surface 3 of upwardly extending edge 2 of bucket dolly 1 may conform to snugly hold bucket 5 in place without the need for any fasteners.

To enable the bucket dolly 1 to be pushed around to carry bucket 5 without having to pick up bucket 5 up to move it, multi-directional wheels 11 of wheeled portion 9 are provided, wherein a holding portion 12 for axle 11a of wheel 11 has a neck 13 with a rod 14 insertable within an extension portion 15 of wheeled portion 9. Extension portion 15 may optionally have a means to raise or lower wheels to a desired height.

Platform 8 of base 7 may optionally be a circular ledge extending from inner edge 3 of bucket dolly 1, wherein there is provided a center gap 16 through which structural brace bars 17, 18 extend to stabilize platform 8 of bucket dolly 1, without the extra weight of a full, continuous platform.

It is understood that other modifications may be made to the present invention without departing from the spirit and scope of the present invention, as set forth in the appended claims.

I claim:

1. A bucket dolly in combination with a bucket comprising:

an open upwardly extending container comprising an upwardly extending solid annular outer wall with an inner extending horizontal ledge for supporting the bottom of said bucket and forming a circular opening under said bucket;

a plurality of elongated bars extending fully across said opening for stabilizing said dolly without adding significant weight thereto;

means mounted on the outside of and extending outwardly from the outer surface of said annular wall for supporting wheeled members below the bottom of said dolly to permit said dolly and bucket contained therein to be wheeled around without tipping; and means mounted on the inside of and extending inwardly from the inner surface of said annular wall for clamping said bucket against movement with respect to said dolly, said clamping means including a hand operated member extending through said annular wall to permit tightening of said clamping means from outside of said annular wall.

* * * * *